(12) United States Patent
Park (10) Patent No.: US 10,628,067 B2
(45) Date of Patent: Apr. 21, 2020

(54) MEMORY SYSTEM AND OPERATING METHOD THEREOF

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/052,189

(22) Filed: Aug. 1, 2018

(65) Prior Publication Data
US 2019/0187901 A1 Jun. 20, 2019

(30) Foreign Application Priority Data
Dec. 15, 2017 (KR) .................. 10-2017-0173561

(51) Int. Cl.
*G06F 3/06* (2006.01)
*G06F 12/06* (2006.01)
(52) U.S. Cl.
CPC ............ *G06F 3/064* (2013.01); *G06F 3/0604* (2013.01); *G06F 3/0658* (2013.01); *G06F 3/0659* (2013.01); *G06F 3/0679* (2013.01); *G06F 12/06* (2013.01); *G06F 2212/202* (2013.01)

(58) Field of Classification Search
CPC ...... G06F 3/064; G06F 3/0659; G06F 3/0679; G06F 3/0658; G06F 3/0604; G06F 12/06; G06F 2212/202
See application file for complete search history.

(56) References Cited

U.S. PATENT DOCUMENTS

| | | | | |
|---|---|---|---|---|
| 7,849,257 B1* | 12/2010 | Kim | ...................... | G06F 3/0604 707/689 |
| 2016/0283401 A1* | 9/2016 | Virajamangala | ...... | G06F 12/122 |
| 2018/0373431 A1* | 12/2018 | Kathawala | .............. | G06F 3/064 |

FOREIGN PATENT DOCUMENTS

KR 1020060120231 11/2006

* cited by examiner

*Primary Examiner* — Mohammed A Bashar
(74) *Attorney, Agent, or Firm* — IP & T Group LLP (57) ABSTRACT

A memory system includes: a plurality of nonvolatile memory devices each including a plurality of memory blocks; and a controller configured to select an innocent open super block among super blocks formed across the nonvolatile memory devices when determining that sequential write operations are to be performed, and perform the sequential write operations on the innocent open super block.

17 Claims, 8 Drawing Sheets

MEMORY SYSTEM AND OPERATING METHOD THEREOF

CROSS-REFERENCES TO RELATED APPLICATION

The present application claims priority under 35 U.S.C. § 119(a) to Korean application number 10-2017-0173561, filed on Dec. 15, 2017, which is incorporated herein by reference in its entirety.

BACKGROUND

1. Technical Field

Various embodiments generally relate to a memory system, and more particularly, to a memory system including a nonvolatile memory device.

2. Related Art

A memory system may be configured to store data provided from a host device, in response to a write request of the host device. Furthermore, the memory system may be configured to provide data stored therein to the host device in response to a read request of the host device. The host device is an electronic device capable of processing data, and may include a computer, digital camera, mobile phone or the like. The memory system may be embedded in the host device, or separately fabricated and connected to the host device.

Continuous demand for improved electronic devices requires development of improved memory devices.

SUMMARY

In an embodiment, a memory system may include: a plurality of nonvolatile memory devices each including a plurality of memory blocks; and a controller configured to select an innocent open super block among super blocks formed across the nonvolatile memory devices when determining that sequential write operations are to be performed, and perform the sequential write operations on the innocent open super block.

In an embodiment, there is an operating method of a memory system which includes a plurality of nonvolatile memory devices each including a plurality of memory blocks. The operating method may include: determining that sequential write operations are to be performed; selecting an innocent open super block among super blocks formed across the nonvolatile memory devices; and performing the sequential write operations on the innocent open super block.

In an embodiment, a memory system may include: a plurality of memory devices including an innocent and open super block having memory blocks of the same address respectively from the memory devices; and a controller suitable for: controlling the memory devices to perform a sequential write operation to the innocent and open super block; and controlling the memory device to perform a pre-read operation to a subsequent memory unit while performing a read operation to a current memory unit in the innocent and open super block.

In an embodiment, a memory system may include: a plurality of memory devices including consecutive first and second super blocks, which are innocent and open and each of which has memory blocks of the same address respectively from the memory devices; and a controller suitable for: controlling the memory devices to perform a sequential write operation to the first and second super blocks; and controlling the memory device to perform a pre-read operation to a subsequent memory unit while performing a read operation to a current memory unit in the first and second super blocks.

These and other features and advantages of the present invention will become apparent to those with ordinary skill in the art to which the present invention belongs from the following description in conjunction with the accompanying drawings.

DETAILED DESCRIPTION

An improved memory system, the advantages and characteristics of the improved memory system and a method for achieving the advantages and characteristics will be described through the following embodiments with reference to the accompanying drawings. However, the present disclosure is not limited only to the embodiments described here, but may be embodied in different other embodiments and variations thereof. The present embodiments are only provided to describe the present disclosure in detail, such that the technical idea of the present disclosure can be easily carried out by those skilled in the art to which the present disclosure pertains.

The embodiments are not limited to specific shapes illustrated in the drawings, and various dimensions and components may be exaggerated for clarity. In this specification, specific terms are used. However, the terms are only used to describe the present disclosure, and do not limit the meanings or the scope of the present disclosure of the invention, described in the claims.

In this specification, an expression such as 'and/or' may indicate including one or more of components listed before/after the expression. Moreover, an expression such as 'connected/coupled' may indicate that one element is directly connected to another element or indirectly connected through another element. The terms of a singular form may include plural forms unless referred to the contrary. Furthermore, the meanings of 'include' and 'comprise' or 'including' and 'comprising' may specify a component, step, operation and element, but do not exclude one or more other components, steps, operations and elements.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature described in connection with one embodiment may be used singly or in combination with other elements of another embodiment, unless specifically indicated otherwise.

Hereafter, exemplary embodiments of the present disclosure will be described with reference to the drawings.

Figure 1:
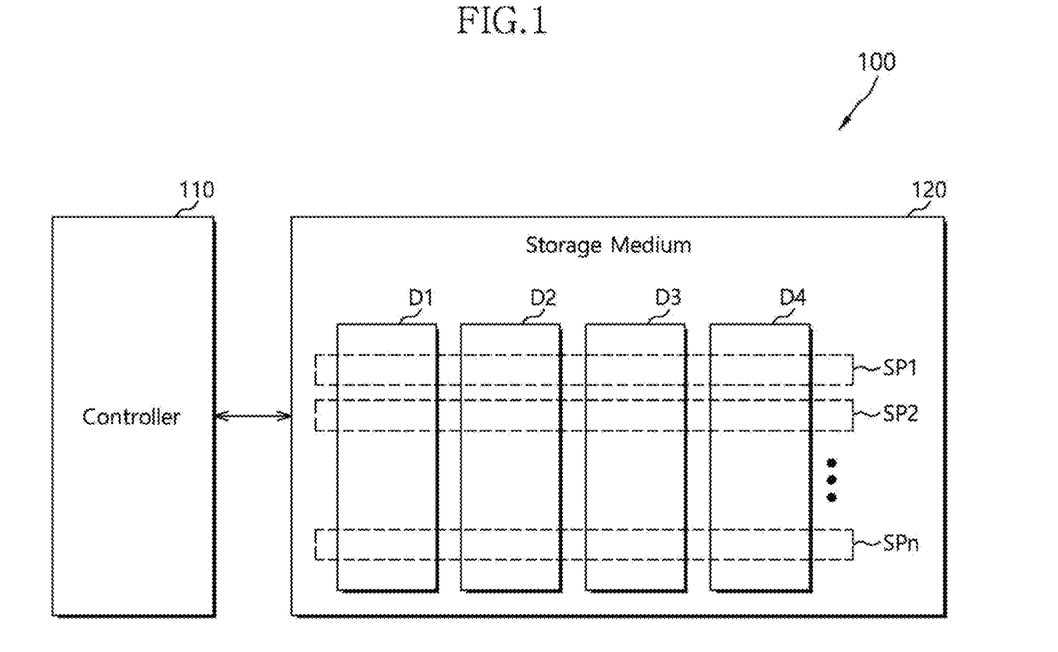
FIG. 1 is a block diagram illustrating a memory system in accordance with an embodiment.

FIG. 1 is a block diagram illustrating a memory system 100 in accordance with an embodiment.

The memory system 100 may be configured to store data provided from an external host device (not illustrated), in response to a write request of the host device. Furthermore, the memory system 100 may be configured to provide data stored therein to the host device, in response to a read request of the host device.

The memory system 100 may include a Personal Computer Memory Card International Association (PCMCIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid-State Drive (SSD) and the like.

The memory system 100 may include a controller 110 and a storage medium 120.

The controller 110 may control overall operations of the memory system 100. The controller 110 may access the storage medium 120 to process a request of the host device. Furthermore, the controller 110 may access the storage medium 120 to perform an internal management operation or background operation of the memory system 100, regardless of a request of the host device. The access to the storage medium 120 may include a write access and read access. That is, the controller 110 may access the storage medium 120 by controlling a write or read operation of the storage medium 120.

The controller 110 may access super blocks SP1 to SPn formed across first to fourth nonvolatile memory devices D1 to D4. The controller 110 may select one or more open super blocks among the super blocks SP1 to SPn, and use the selected open super block to store data. The controller 110 may store data only in the open super block. When the open super block has no more empty memory units and thus becomes closed, the controller 110 may select another open super block to use.

When determining that sequential write operations are to be performed, the controller 110 may select an innocent open super block among the super blocks SP1 to SPn. The innocent open super block may include open memory blocks (not illustrated) having the same block address among the first to fourth nonvolatile memory devices D1 to D4. The innocent open super block may include normal memory blocks (not illustrated) without a replaced memory block therein. An innocent open super block will be described in detail.

When determining that sequential read operations are to be performed, the controller 110 may control each of the first to fourth nonvolatile memory devices D1 to D4 to perform a pre-read operation while performing a read operation. During the pre-read operation while a current read operation is being performed, the first to fourth nonvolatile memory devices D1 to D4 buffer in a buffer region BR (see FIG. 2) data which are expected to be read subsequently through a read operation, i.e., immediately after the current read operation. When the pre-read data is a cache hit during the subsequent read operation, pre-read data may be directly outputted to the controller 110 as a result of the subsequent read operation. In accordance with the present embodiment, the controller 110 selects an innocent open super block to perform sequential write operations, and thus the cache hit rate of the pre-read data can be retained at a high rate. The pre-read operation will be described in detail later.

The storage medium 120 may store data transmitted from the controller 110, or read data stored therein and transmit the read data to the controller 110, according to control of the controller 110.

The storage medium 120 may include the first to fourth nonvolatile memory devices D1 to D4. Each of the first to fourth nonvolatile memory devices D1 to D4 may perform a pre-read operation while performing a read operation, according to control of the controller 110. Each of the first to fourth nonvolatile memory devices D1 to D4 may perform the pre-read operation on a memory unit succeeding a memory unit that is a target of the current read operation.

The nonvolatile memory device may include a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

FIG. 1 illustrates that the storage medium 120 includes the first to fourth nonvolatile memory devices D1 to D4, but the number of nonvolatile memory devices included in the storage medium 120 is not limited thereto.

Figure 2:
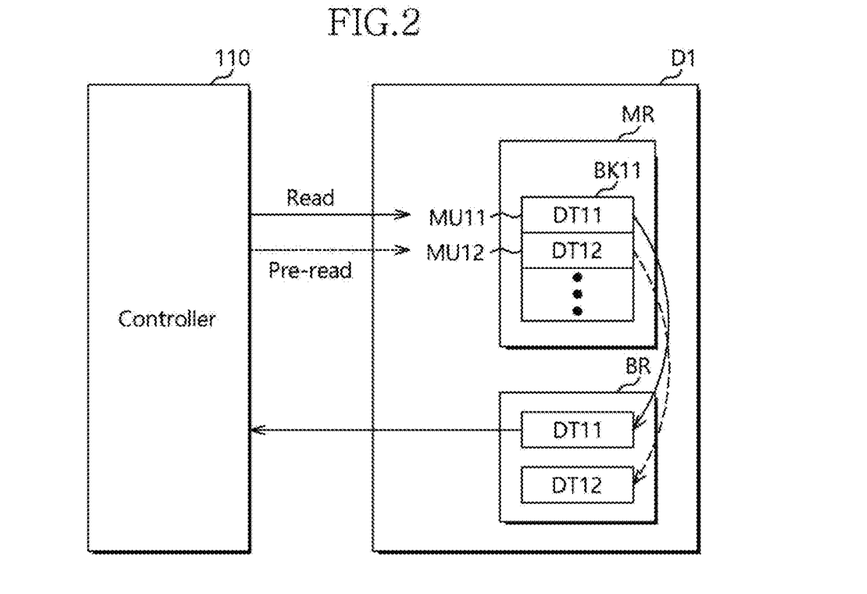
FIG. 2 illustrates a method in which a first nonvolatile memory device performs a pre-read operation in accordance with the embodiment.

FIG. 2 illustrates a pre-read operation method of the first nonvolatile memory device D1, in accordance with an embodiment of the present invention. The second to fourth nonvolatile memory devices D2 to D4 of FIG. 1 may be configured and operated in a similar manner to the first nonvolatile memory device D1.

Referring to FIG. 2, the first nonvolatile memory device D1 may include a main region MR and a buffer region BR.

The main region MR indicates a region in which data are stored. Although not illustrated, the main region MR may include a plurality of memory cells. Each of the memory cells may store one or more data bits.

The buffer region BR indicate a region in which data transmitted from the controller 110 so as to be stored in the main region MR or data read from the main region MR so as to be outputted to the controller 110 are temporarily stored, i.e. buffered.

The first nonvolatile memory device D1 may perform a read operation on a memory unit MU11 of the memory block BK11 according to control of the controller 110. Therefore, data DT11 stored in the memory unit MU11 may be read into the buffer region BR, and then outputted to the controller 110.

While performing the read operation to the memory unit MU11, the first nonvolatile memory device D1 may perform a pre-read operation on a memory unit MU12 according to control of the controller 110. The memory unit MU12 may be one succeeding the memory unit MU11. Therefore, data DT12 stored in the memory unit MU12 may be pre-read into the buffer region BR during the read operation to the memory unit MU11. The pre-read operation may be performed while the data DT11 read before the data DT12 are outputted to the controller 110. Thus, the pre-read operation may not require an additional operation time.

Then, when the pre-read data DT12 of the buffer region BR are data requested by the host device, that is, when the pre-read data DT12 is determined to be a "cache hit" for a read operation which is performed subsequently (immediately after) to the read operation to memory unit MU11, the controller 110 may control the first nonvolatile memory device D1 to output the pre-read data DT12 as a result of the subsequent read operation. As a result, a time that is typically required for reading data from the memory unit MU12 into the buffer region BR is not necessary during the subsequent read operation.

On the other hand, when the pre-read data DT12 of the buffer region BR are not data requested by the host device, that is, when the pre-read data DT12 is determined to be a "cache miss" for a read operation subsequent to the read operation to memory unit MU11, the controller 110 may control the first nonvolatile memory device D1 to ignore the pre-read data DT2 and to read data which are actually requested during the subsequent read operation.

The memory unit MU12 on which the pre-read operation is performed may correspond to a memory unit succeeding the memory unit MU11 on which the read operation is currently performed. In this specification, when a memory unit succeeds another memory unit, it is may indicate that the physical addresses of the memory units are consecutive addresses.

The pre-read operation may be performed when it is determined that the host device transmits sequential read requests. A method for determining whether sequential read operations are being transmitted may be based on a variety of well-known methods for determining/estimating a work load of the host device. The sequential read requests may relate to data on which sequential write operations were performed. Furthermore, since the sequential write operations are performed on consecutive addresses, the pre-read operation may be performed on consecutive addresses.

Whenever instructing the first nonvolatile memory device D1 to perform a read operation, the controller 110 may instruct the first nonvolatile memory device D1 to perform a pre-read operation at the same time when the read requests are determined as sequential.

In another embodiment, the controller 110 may initially provide only one instruction to the first nonvolatile memory device D1, such that the first nonvolatile memory device D1 performs a read operation and a pre-read operation at the same time by default. Then, when it is determined that the pre-read operation is not necessary, the controller 110 may instruct the first nonvolatile memory device D1 not to perform the pre-read operation.

Figure 3:
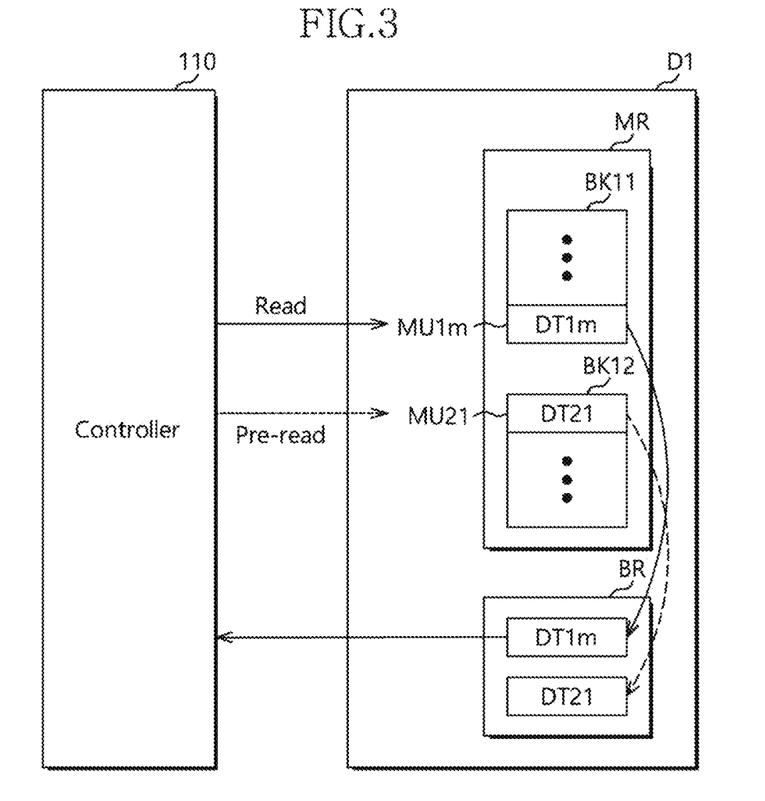
FIG. 3 illustrates a method in which the first nonvolatile memory device performs a pre-read operation on a consecutive memory block in accordance with an embodiment.

FIG. 3 illustrates a method in which the first nonvolatile memory device D1 performs a pre-read operation on a consecutive memory block BK12 in accordance with an embodiment.

Referring to FIG. 3, the first nonvolatile memory device D1 may perform a read operation on a memory unit MU1m according to control of the controller 110. Therefore, data stored DT1m stored in the memory unit MU1m may be read into the buffer region BR, and then outputted to the controller 110.

The memory unit MU1m may be the last memory unit of the memory block BK11. That is, the memory unit MU1m may have the last address in the memory block BK11.

In this case, the first nonvolatile memory device D1 may perform a pre-read operation on the first memory unit MU21 of the memory block BK12, succeeding the memory block BK11. The physical block addresses of the memory blocks BK11 and BK12 may be consecutive. The memory unit MU12 may have the first address in the memory block BK12.

Figure 4:
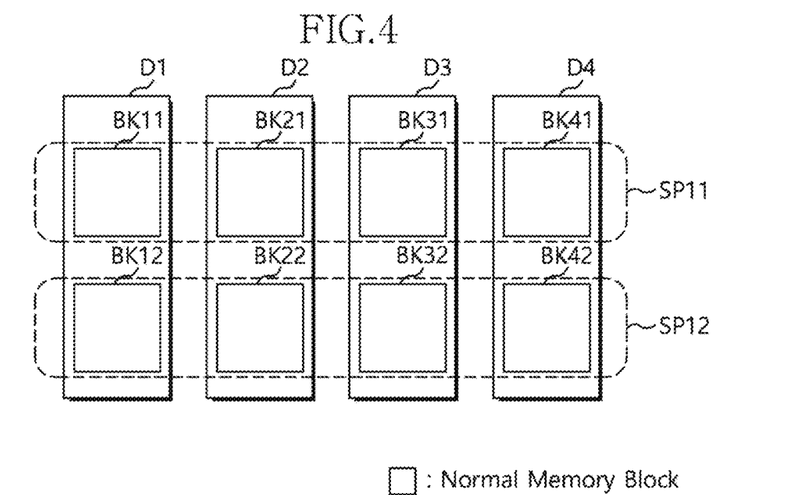
FIG. 4 is a block diagram illustrating super blocks formed across first to fourth nonvolatile memory devices in accordance with an embodiment.

FIG. 4 is a block diagram illustrating super blocks SP11 and SP12 formed across the first to fourth nonvolatile memory devices D1 to D4 in accordance with an embodiment.

Referring to FIG. 4, the controller 110 may form the super block SP1 across the first to fourth nonvolatile memory devices D1 to D4. The super block SP11 may include one memory block from each of the first to fourth nonvolatile memory devices D1 to D4. In another embodiment, the super block SP11 may include two or more memory blocks respectively from the first to fourth nonvolatile memory devices D1 to D4. The controller 110 may perform write operations on the memory blocks BK11 to BK41 included in the super block SP11 in parallel, i.e., at the same time.

The memory blocks BK11 to BK41 included in the single super block SP11 may have the same block address in the respective first to fourth nonvolatile memory devices D1 to D4.

The controller 110 may form the super block SP12 in a similar manner to the super block SP11. The super block SP12 may include memory blocks BK12 to BK42. All of the memory blocks included in the super blocks SP11 and SP12 may be normal blocks.

The controller 110 may manage information on the super blocks SP11 and SP12, that is, super block information. The super block information may contain information on the memory blocks included in the super blocks SP11 and SP12. The super block information may be generated when the memory system 100 is produced, and changed during an operation of the memory system 100.

As described above, the controller 110 may select one or more open super blocks, and use the selected open super block to store data. The selected open super block may succeed a super block which is previously used and thus becomes closed. Consecutive super blocks may be memory blocks having consecutive block addresses. That is, when the memory blocks included in the super blocks SP11 and SP12 in the first to fourth nonvolatile memory devices D1 to D4 have consecutive block addresses, the super blocks SP11 and SP12 may succeed each other.

Figure 5:
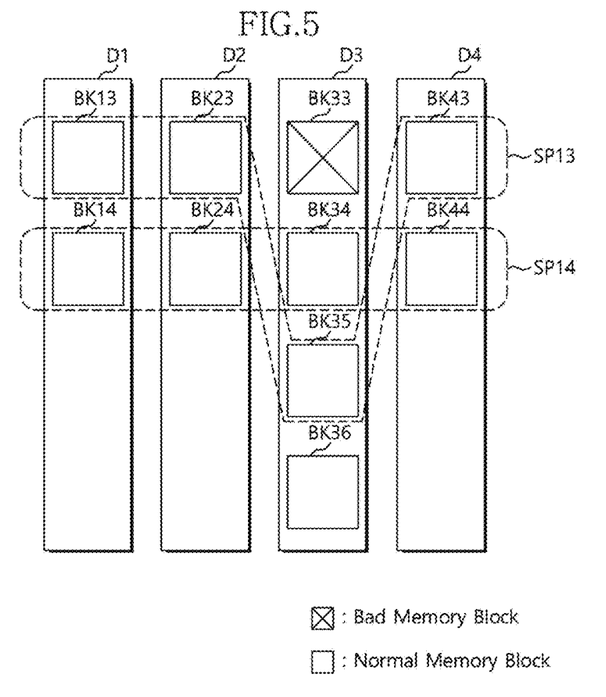
FIG. 5 is a block diagram illustrating super blocks formed by replacing a bad memory block in accordance with an embodiment.

FIG. 5 is a block diagram illustrating super blocks SP13 and SP14 formed by replacing a bad memory block BK33 in accordance with the present embodiment.

Referring to FIG. 5, the third nonvolatile memory device D3 may include a bad memory block BK33. In this case, the controller 110 may form a super block using a normal memory block BK35 instead of the bad memory block BK33 in the third nonvolatile memory device D3. The normal memory block BK35 may be a memory block replacing the bad memory block BK33. The super block SP13 may include memory blocks BK13, BK23 and BK43 having the same address as the bad memory block BK33 in the first, second and fourth nonvolatile memory devices D1, D2 and D4, respectively.

The controller 110 may form the super block 14 using normal memory blocks BK14 to BK44 of the first to fourth nonvolatile memory devices D1 to D4. The normal memory blocks BK14 to BK44 included in the super block SP14 may have the same block address.

Except the bad memory block BK33, the super blocks SP13 and SP14 may include memory blocks at consecutive block addresses in the first to fourth nonvolatile memory devices D1 to D4. That is, the super blocks SP13 and SP14 may succeed each other while being consecutively open.

Figure 6:
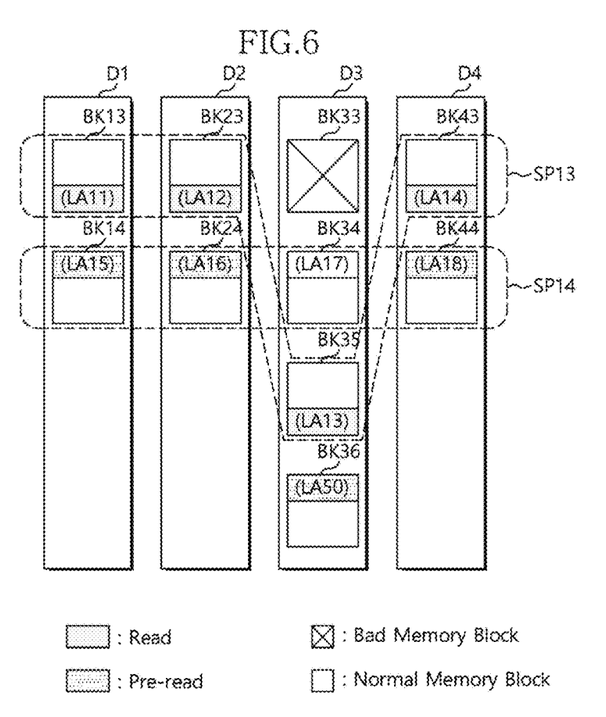
FIG. 6 illustrates that a pre-read data is a cache miss when a read operation is performed on a replaced memory block.

FIG. 6 illustrates that a pre-read data is a cache miss when a read operation is performed on the replaced memory block BK35. FIG. 6 illustrates the super blocks SP13 and SP14 of FIG. 5.

Referring to FIG. 6, it is assumed that memory units indicated by consecutive logical address LA11 to LA18 in the super blocks SP13 and SP14 store sequential data of the logical addresses LA11 to LA18. Furthermore, it is assumed that the host device transmitted sequential read requests for the logical addresses LA11 to LA18.

The first to fourth nonvolatile memory devices D1 to D4 may perform a read operation on the memory units of the logical addresses LA11 to LA14 according to control of the controller 110. It is assumed that the memory units of the logical addresses LA11 to LA14 are the last memory units of the memory blocks BK13, BK23, BK35 and BK43 of the super block SP13.

When the first to fourth nonvolatile memory devices D1 to D4 are to perform a pre-read operation according to control of the controller 110, the first to fourth nonvolatile memory devices D1 to D4 may select the memory blocks BK14, BK24, BK36 and BK44 succeeding the memory blocks BK13, BK23, BK35 and BK43, respectively. The first to fourth nonvolatile memory devices D1 to D4 may perform a pre-read operation on the first memory units of the memory blocks BK14, BK24, BK36 and BK44, that is, the memory units of the logical addresses LA15, LA16, LA50 and LA18, which are consecutive to the memory units of the logical addresses LA11, LA12, LA13 and LA14 respectively in the memory blocks BK13, BK23, BK35 and BK43 forming the super memory block SP13. Note that the memory blocks BK14, BK24, BK36 and BK44 respectively including the memory units of the logical addresses LA15, LA16, LA50 and LA18 do not from the super memory block SP14.

In this case, the memory units of the logical addresses LA15 to LA18 may be subsequently read according to the sequential read requests. Therefore, the data pre-read through the pre-read operations of the first, second and fourth nonvolatile memory devices D1, D2 and D4 on the memory units of the logical addresses LA15, LA16 and LA18 may be cache hits. However, the data pre-read through the pre-read operation of the third nonvolatile memory device D3 on the memory unit of the logical address LA50 may be a cache miss. When the pre-read data is a cache miss, a response speed for the sequential read requests may be slowed.

Figure 7:
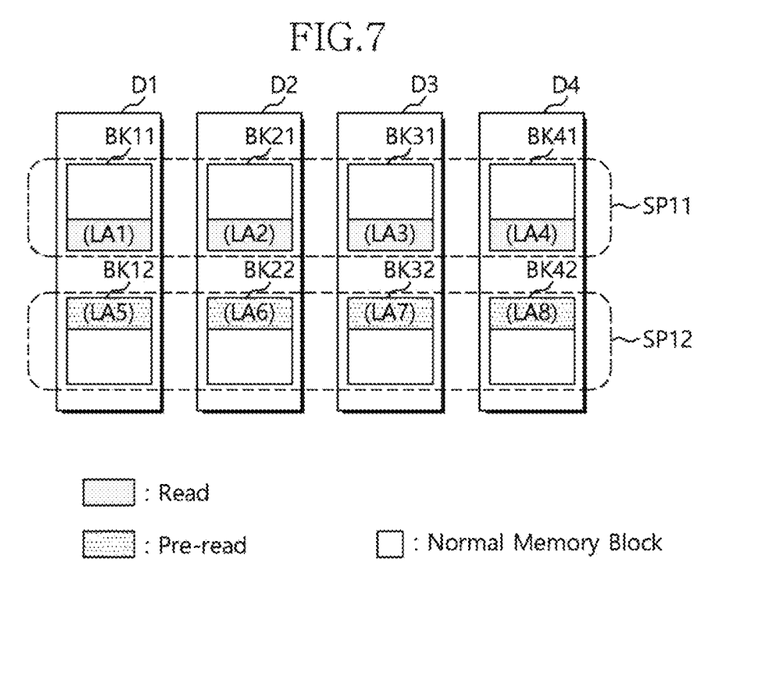
FIG. 7 illustrates an operation of selecting innocent open super blocks for sequential write operations, in accordance with an embodiment.

FIG. 7 illustrates an operation of selecting innocent open super blocks SP11 and SP12 to perform sequential write operations, in accordance with an embodiment of the present invention.

For maintaining the cache hit rate of the pre-read operation at a high rate, the controller 110 may select an open super block including no replaced memory block, that is, an innocent open super block to perform sequential write operations. Thus, an innocent open super block includes only normal memory blocks without any replaced memory block. The innocent open super block may include memory blocks having the same block address in the respective first to fourth nonvolatile memory devices D1 to D4.

For determining which super block is an innocent open super block, the controller 110 may refer to the super block information containing information on whether a replaced memory block is used.

In an embodiment, when selecting an open super block, the controller 110 may select an innocent open super block in the case where it is predicted that sequential write operations are to be performed. A method for predicting sequential write operations may be based on a variety of well-known methods for estimating a work load of the host device.

In another embodiment, when it is determined that sequential write operations are to be performed, the controller 110 may select an innocent open super block succeeding a super block to be closed. However, when the super block succeeding the super block to be closed is not innocent, the controller 110 may select the next succeeding innocent open super block.

In another embodiment, the controller 110 may determine a number of consecutive innocent open super blocks to be selected when sequential write operations are to be performed on two or more super blocks. In this case the controller 110 may select the first innocent open super block among the determined number of consecutive innocent open super blocks.

Therefore, referring to FIG. 7, the innocent open super blocks SP11 and SP12 may be selected when sequential write operations are scheduled over two super memory blocks. It is assumed that the last memory units of the innocent open super block SP11 and the first memory units of the innocent open super block 512 may correspond to consecutive logical addresses LA1 to LA8.

The first to fourth nonvolatile memory devices D1 to D4 may perform a pre-read operation on the memory units of the logical addresses LA5 to LA8 while performing a read operation on the memory units of the logical address LA1 to LA4, according to control of the controller 110. As a result, the data pre-read through the pre-read operations on the memory units of the logical addresses LA5 to LA8 may be cache hits during the sequential read operations.

Figure 8:
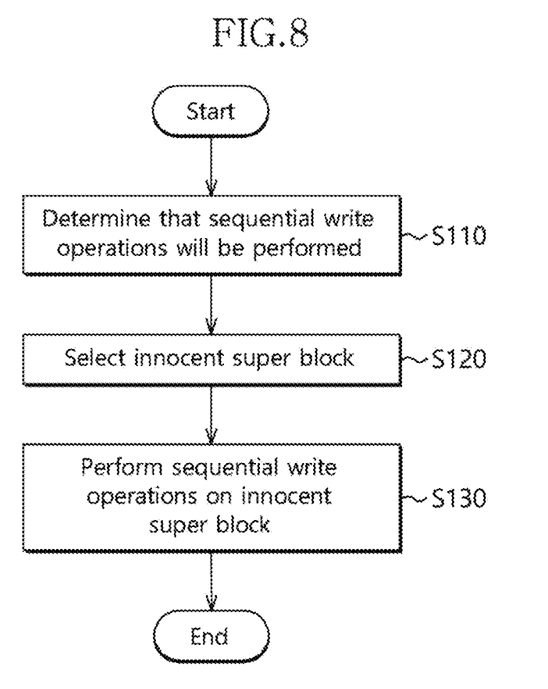
FIG. 8 is a flowchart illustrating an operating method of a memory system in accordance with an embodiment.

FIG. 8 is a flowchart illustrating an operating method of the memory system 100 in accordance with an embodiment of the present invention.

Referring to FIG. 8, the controller 110 may determine that sequential write operations are to be performed, at step S110. The sequential write operations may indicate write operations on data to which consecutive logical addresses are assigned by a host device.

At step S120, the controller 110 may select an innocent open super block among the super blocks SP1 to SPn of the storage medium 120. The innocent open super block may include memory blocks having the same block address in the respective first to fourth nonvolatile memory devices D1 to D4. The innocent open super block may include normal memory blocks without a replaced memory block, in the first to fourth nonvolatile memory devices D1 to D4.

The controller 110 may exclude a super block including a replaced memory block from the selection. The controller 110 may select an innocent open super block by referring to super block information. The super block information may contain information on whether each of the super blocks includes a replaced memory block.

When a second super block succeeding a first super block to be closed is innocent and open, the controller 110 may select the second super block. When the second super block is not innocent, the controller 110 may not select the second super block, but select a third super block, which is open and succeeds the second super block depending on the innocence of the third super block.

When a predetermined number of consecutive super blocks among the super blocks are all innocent and open, the controller 110 may select the first super block among the consecutive super blocks.

At step S130, the controller 110 may perform sequential write operations on the selected innocent open super block.

Figure 9:
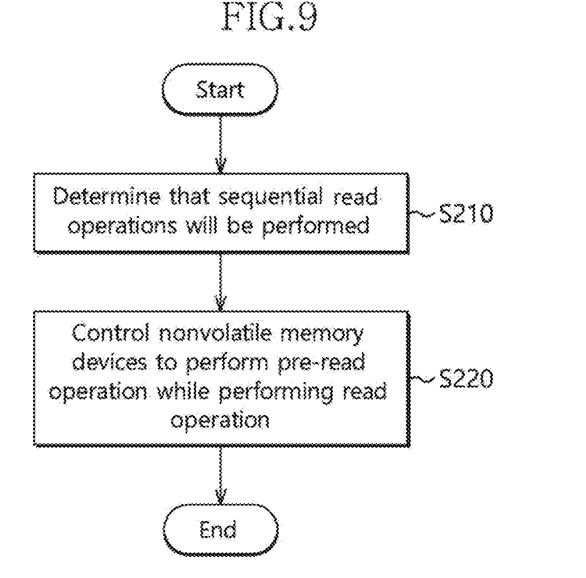
FIG. 9 is a flowchart illustrating an operating method of a memory system in accordance with an embodiment.

FIG. 9 is a flowchart illustrating an operating method of the memory system 100 in accordance with an embodiment of the present invention.

Referring to FIG. 9, the controller 110 may determine that sequential read operations are to be performed, at step S210.

At step S220, the controller 110 may control each of the first to fourth nonvolatile memory devices D1 to D4 to perform a pre-read operation to a subsequent memory unit while performing a read operation to a current memory unit. Each of the first to fourth nonvolatile memory devices D1 to D4 may perform the pre-read operation on a memory unit succeeding a memory unit on which the read operation is performed. When the controller 110 performs the sequential write operations on the innocent open super block, the cache hit rate of the pre-read operation may be retained at a high rate.

Figure 10:
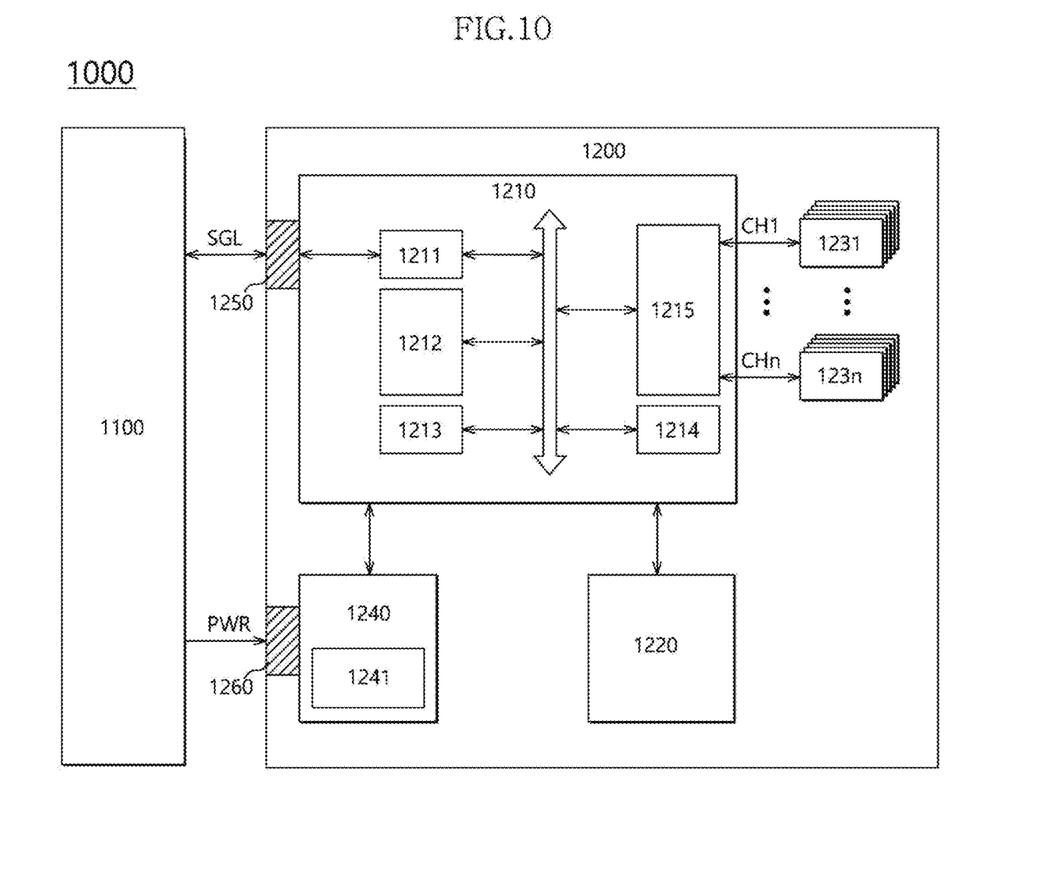
FIG. 10 is a diagram illustrating a data processing system including a solid-state drive (SSD) in accordance with an embodiment.

FIG. 10 is a diagram illustrating a data processing system 1000 including a solid-state drive (SSD) 1200 in accordance with an embodiment of the present invention. Referring to FIG. 10, the data processing system 1000 may include a host device 1100 and the SSD 1200.

The SSD 1200 may include a controller 1210, a buffer memory device 1220, a plurality of nonvolatile memory devices 1231 to 123*n*, a power supply 1240, a signal connector 1250, and a power connector 1260.

The controller 1210 may control general operations of the SSD 1200. The controller 1210 may be configured in the same manner as the controller 110 shown in FIG. 1.

The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E) and universal flash storage (UFS).

The control unit 1212 may analyze and process the signal SGL received from the host device 1100. The control unit 1212 may control operations of internal function blocks according to a firmware or a software for driving the SSD 1200. The random access memory 1213 may be used as a working memory for driving such a firmware or software.

The ECC unit 1214 may generate the parity data of data to be transmitted to at least one of the nonvolatile memory devices 1231 to 123*n*. The generated parity data may be stored together with the data in the nonvolatile memory devices 1231 to 123*n*. The ECC unit 1214 may detect an error of the data read from at least one of the nonvolatile memory devices 1231 to 123*n*, based on the parity data. If a detected error is within a correctable range, the ECC unit 1214 may correct the detected error.

The memory interface unit 1215 may provide control signals such as commands and addresses to at least one of the nonvolatile memory devices 1231 to 123*n*, according to control of the control unit 1212. Moreover, the memory interface unit 1215 may exchange data with at least one of the nonvolatile memory devices 1231 to 123*n*, according to control of the control unit 1212. For example, the memory interface unit 1215 may provide the data stored in the buffer memory device 1220, to at least one of the nonvolatile memory devices 1231 to 123*n*, or provide the data read from at least one of the nonvolatile memory devices 1231 to 123*n*, to the buffer memory device 1220.

The buffer memory device 1220 may temporarily store data to be stored in at least one of the nonvolatile memory devices 1231 to 123*n*. Further, the buffer memory device 1220 may temporarily store the data read from at least one of the nonvolatile memory devices 1231 to 123*n*. The data temporarily stored in the buffer memory device 1220 may be transmitted to the host device 1100 or at least one of the nonvolatile memory devices 1231 to 123*n* according to control of the controller 1210.

The nonvolatile memory devices 1231 to 123*n* may be used as storage media of the SSD 1200. The nonvolatile memory devices 1231 to 123*n* may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 11:
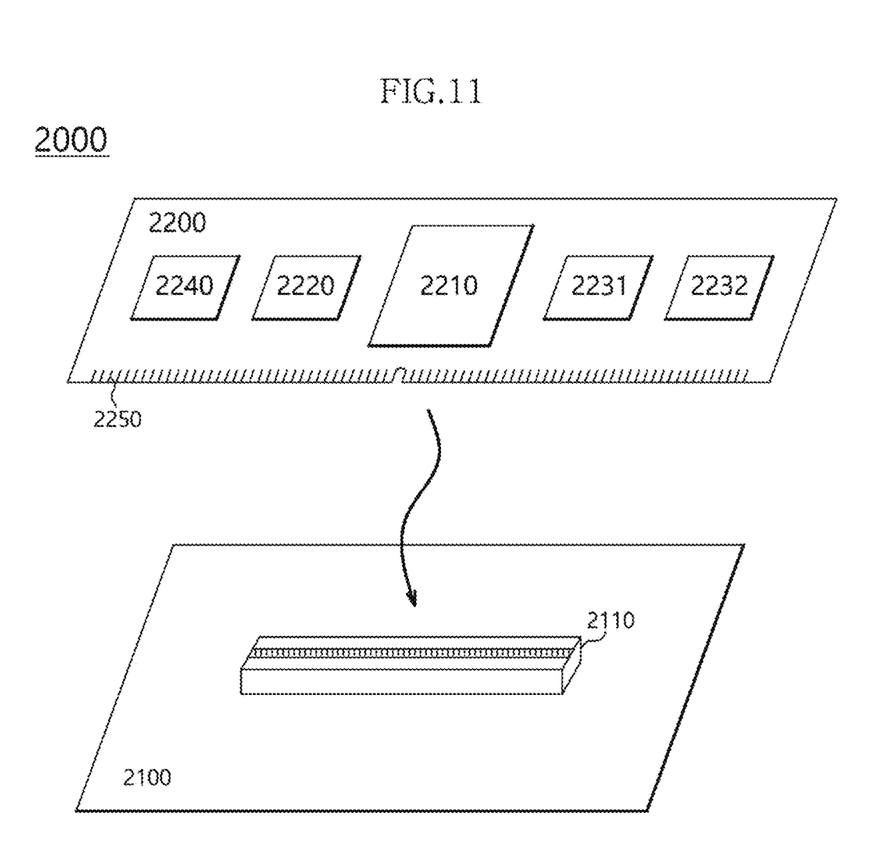
FIG. 11 is a diagram illustrating a data processing system including a memory system in accordance with an embodiment.

FIG. 11 is a diagram illustrating a data processing system 2000 including a memory system 2200 in accordance with an embodiment of the present invention. Referring to FIG. 11, the data processing system 2000 may include a host device 2100 and the memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The memory system 2200 may be mounted to the connection terminal 2110.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 1210 shown in FIG. 10.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the memory system 2200. The connection terminal 2250 may be configured into various types depending on an interface scheme between the host device 2100 and the memory system 2200. The connection terminal 2250 may be disposed on any one side of the memory system 2200.

Figure 12:
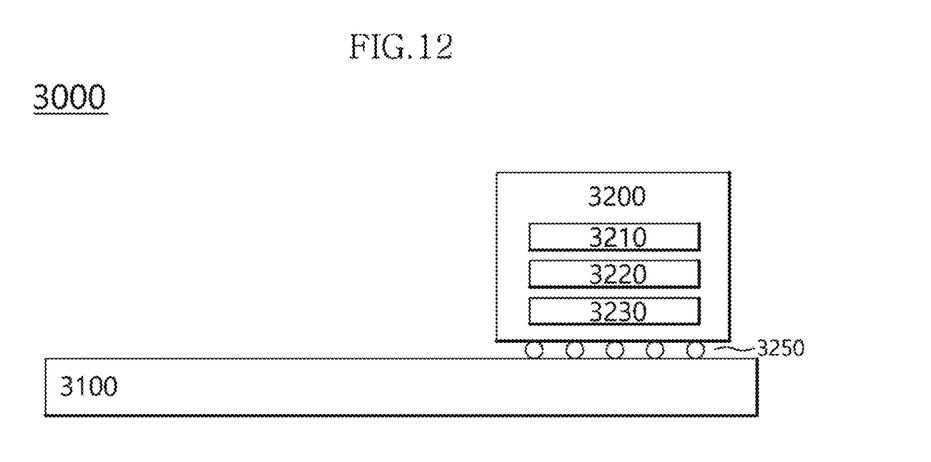
FIG. 12 is a diagram illustrating a data processing system including a memory system in accordance with an embodiment.

FIG. 12 is a diagram illustrating a data processing system 3000 including a memory system 3200 in accordance with an embodiment of the present invention. Referring to FIG. 12, the data processing system 3000 may include a host device 3100 and the memory system 3200.

The host device 3100 may be configured in the form of a board such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 1210 shown in FIG. 10.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 13:
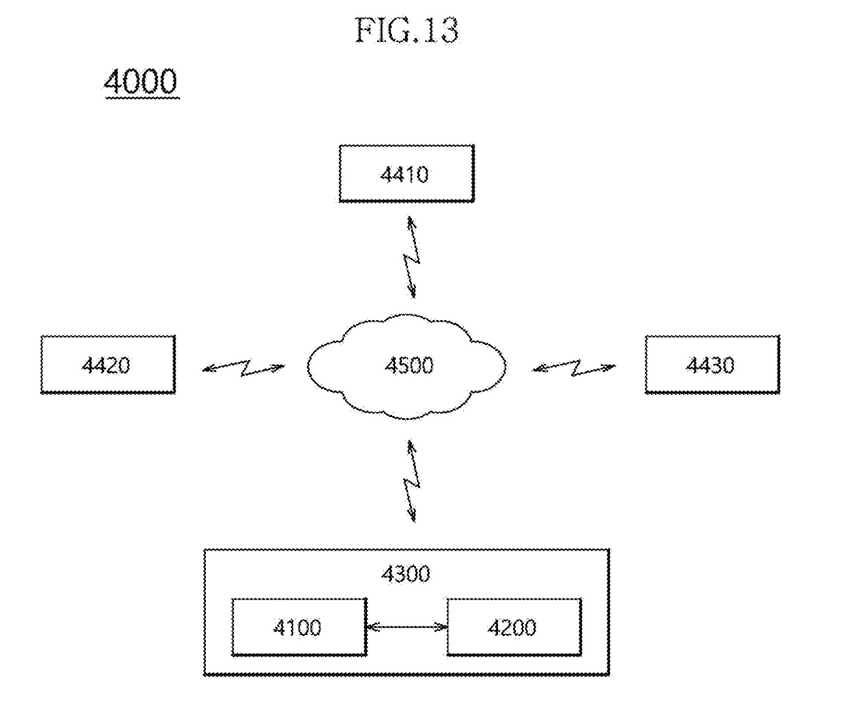
FIG. 13 is a diagram illustrating a network system including a memory system in accordance with an embodiment.

FIG. 13 is a diagram illustrating a network system 4000 including a memory system 4200 in accordance with an embodiment of the present invention. Referring to FIG. 13, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 100 shown in FIG. 1, the memory system 1200 shown in FIG. 10, the memory system 2200 shown in FIG. 11 or the memory system 3200 shown in FIG. 12.

Figure 14:
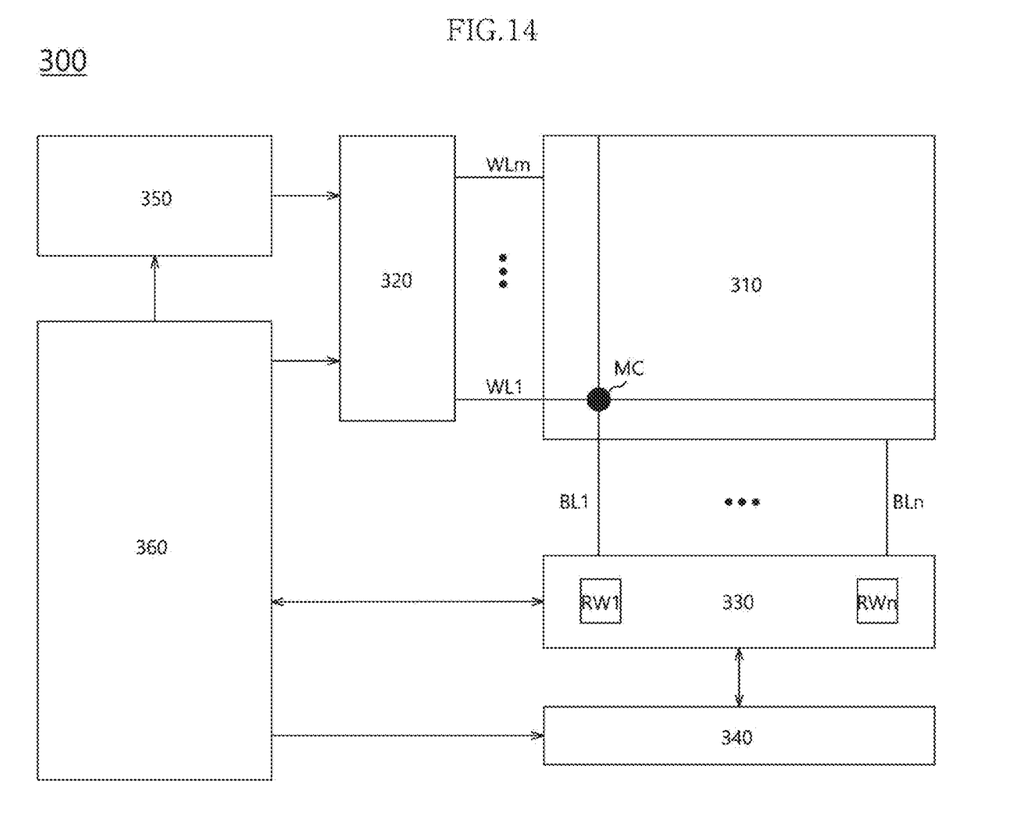
FIG. 14 is a block diagram illustrating a nonvolatile memory device included in a memory system in accordance with an embodiment.

FIG. 14 is a block diagram illustrating a nonvolatile memory device 300 included in a memory system in accordance with an embodiment of the present invention. Referring to FIG. 14, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While various embodiments have been described above, it will be understood to those skilled in the art that the embodiments described are examples only. Accordingly, the operating method of a data storage device described herein should not be limited based on the described embodiments.

What is claimed is:

1. A memory system comprising:
    a plurality of nonvolatile memory devices including a plurality of memory blocks which are grouped into a plurality of super blocks, each super block consisting of one or more memory blocks in each of the nonvolatile memory devices; and
    a controller configured to replace a first memory block included in a super block with a second memory block when the first memory block becomes a bad memory block so that the super block consists of memory blocks having different physical block addresses, choose an innocent open super block over the super block among the super blocks when determining that sequential write operations are to be performed, and perform the sequential write operations on the innocent open super block,
    wherein the innocent open super block consists of memory blocks having the same physical block address in the nonvolatile memory devices.

2. The memory system according to claim 1, wherein the innocent open super block comprises normal memory blocks without the replaced memory block in the nonvolatile memory devices.

3. The memory system according to claim 1, wherein the controller excludes the super block from the performing of the sequential write operations.

4. The memory system according to claim 3, wherein the controller selects the innocent open super block by referring to super block information, and
    the super block information contains information on whether each of the super blocks includes the replaced memory block.

5. The memory system according to claim 1, wherein, when a second super block succeeding a first super block to be closed is innocent, the controller selects the second super block as the innocent open super block, and when the second super block is not innocent the controller does not select the second super block but selects a third super block succeeding the second super block as the innocent open super block depending on innocence of the third super block.

6. The memory system according to claim 1, wherein when a predetermined number of consecutive super blocks among the super blocks are all innocent, the controller selects a first super block among the consecutive super blocks as the innocent open super block.

7. The memory system according to claim 1, wherein when it is determined that sequential read operations are to be performed, the controller controls each of the nonvolatile memory devices to perform a pre-read operation while performing a read operation.

8. The memory system according to claim 7, wherein each of the nonvolatile memory devices performs the pre-read operation on a second memory unit succeeding a first memory unit on which the read operation is performed.

9. An operating method of a memory system which includes a plurality of nonvolatile memory devices including a plurality of memory blocks which are grouped into a plurality of super blocks, each super block consisting of one or more memory blocks in each of the nonvolatile memory devices, the operating method comprising:
    replacing a first memory block included in a super block with a second memory block when the first memory block becomes a bad memory block so that the super block consists of memory blocks having different physical block addresses;
    determining that sequential write operations are to be performed;
    choosing an innocent open super block over the super block among the super blocks; and
    performing the sequential write operations on the innocent open super block,
    wherein the innocent open super block consists of memory blocks having the same physical block address in the nonvolatile memory devices.

10. The operating method according to claim 9, wherein the innocent open super block comprises normal memory blocks without the replaced memory block in the nonvolatile memory devices.

11. The operating method according to claim 9, wherein the choosing of the innocent open super block comprises excluding the super block from the selection.

12. The operating method according to claim 11, wherein the selecting of the innocent open super block comprises selecting the innocent open super block by referring to super block information,
    wherein the super block information contains information on whether each of the super blocks includes the replaced memory block.

13. The operating method according to claim 9, wherein the selecting of the innocent open super block comprises:
    when a second super block succeeding a first super block to be closed is innocent, selecting the second super block as the innocent open super block; and
    when the second super block is not innocent, not selecting the second super block, but selecting a third super block succeeding the second super block as the innocent open super block depending on innocence of the third super block.

14. The operating method according to claim 9, wherein the selecting of the innocent open super block comprises selecting a first super block in a predetermined number of consecutive super blocks among the super blocks as the innocent open super block, when the consecutive super blocks are all innocent.

15. The operating method according to claim 9, further comprising controlling each of the nonvolatile memory devices to perform a pre-read operation while performing a read operation, when it is determined that sequential read operations are to be performed.

16. The operating method according to claim 15, further comprising performing, by each of the nonvolatile memory devices, the pre-read operation on a second memory unit succeeding a first memory unit on which the read operation is performed.

17. A memory system comprising:
a plurality of memory devices including an innocent and open super block having memory blocks of the same address respectively from the memory devices; and
a controller suitable for:
replacing a first memory block included in a super block with a second memory block when the first memory block becomes a bad memory block so that the super block consists of memory blocks having different physical addresses;
controlling the memory devices to perform a sequential write operation to the innocent and open super block by choosing the innocent open super block over the super block; and
controlling the memory device to perform a pre-read operation to a subsequent memory unit while performing a read operation to a current memory unit in the innocent and open super block,
wherein the innocent and open super block does not comprise a replaced memory block replacing a bad memory block in the memory devices.

* * * * *